June 10, 1952  E. T. DAVIS  2,599,617
DRAWBAR CONTROL
Filed Nov. 26, 1947  2 SHEETS—SHEET 1
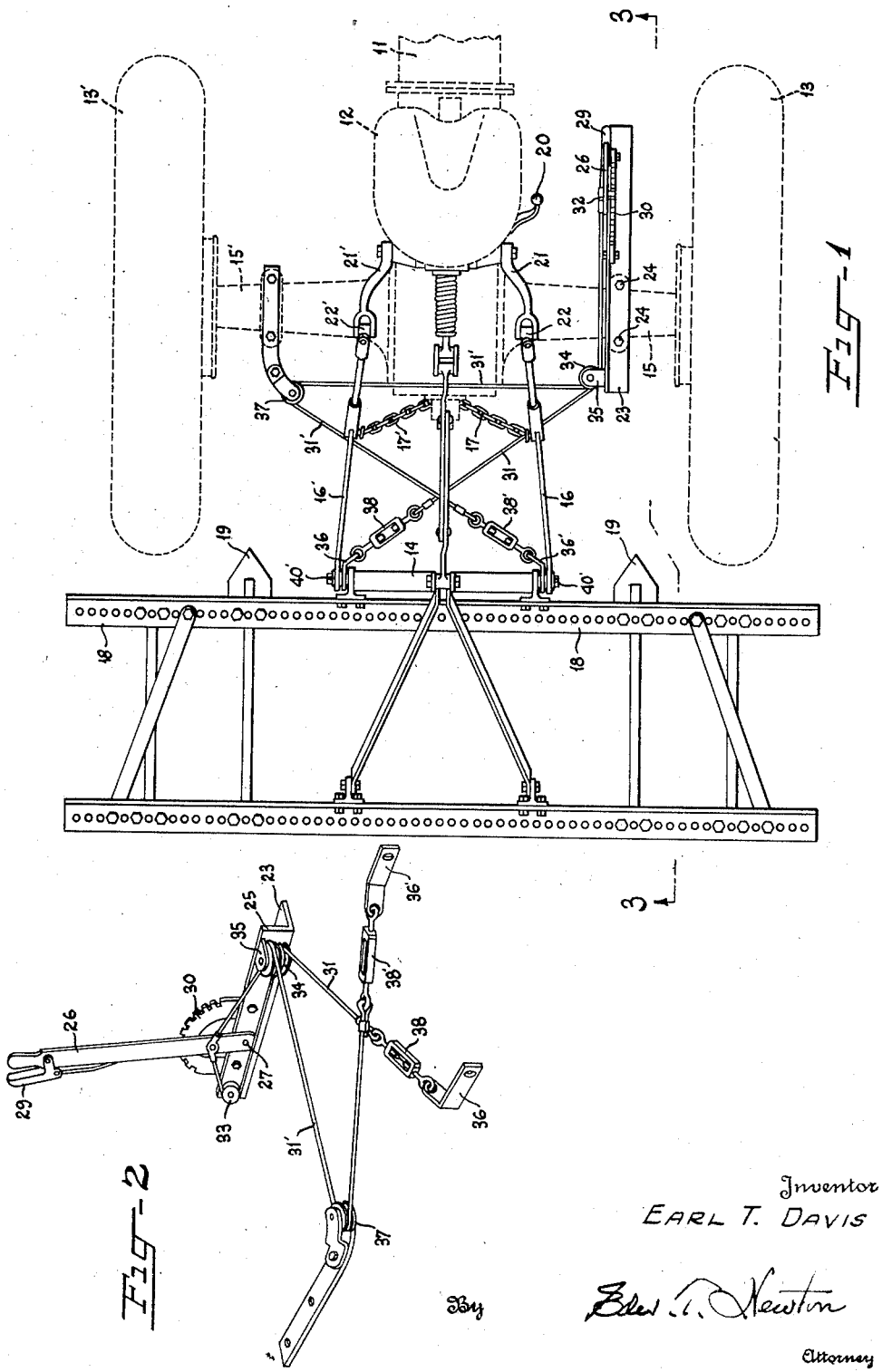
Inventor
EARL T. DAVIS
By
Attorney

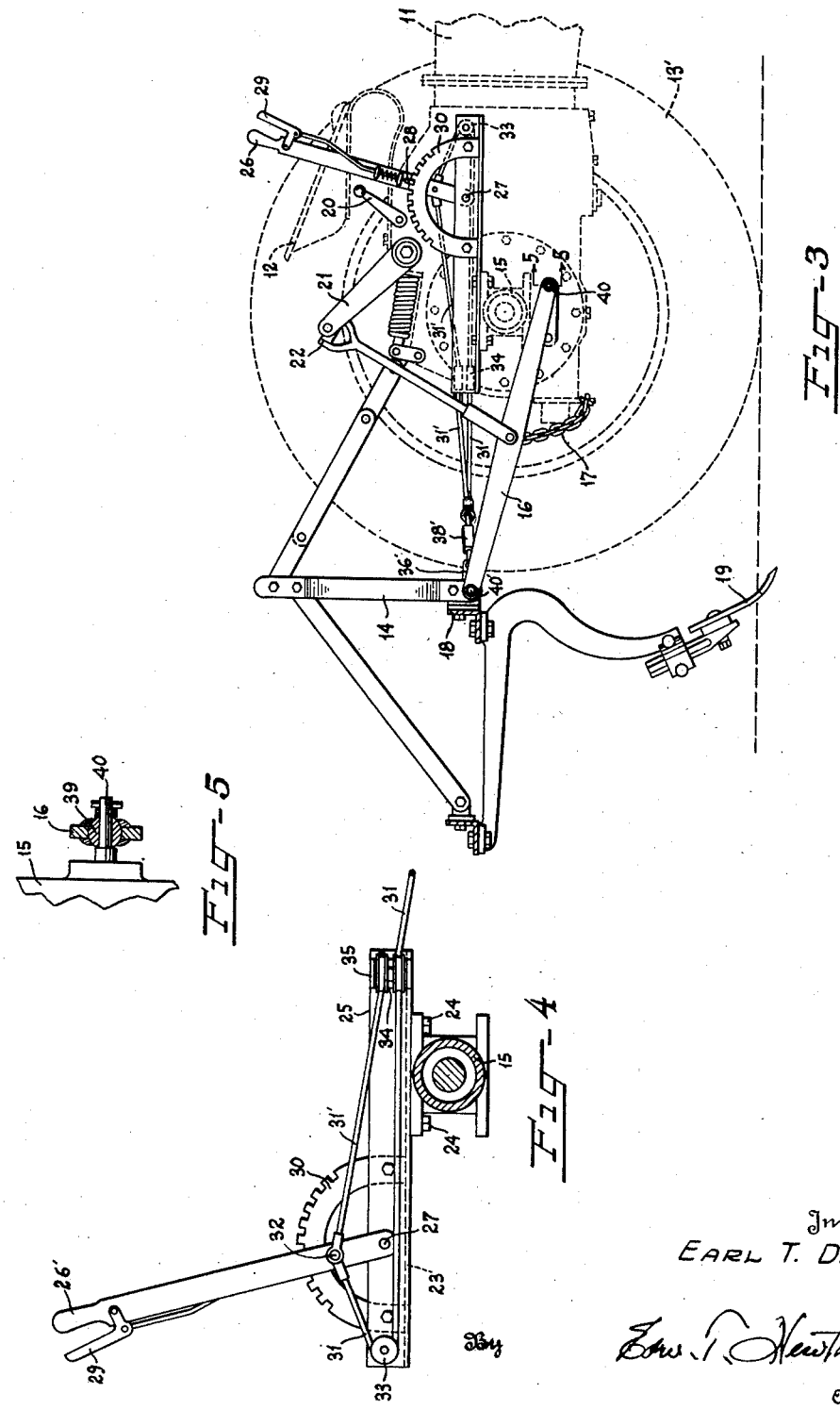

Patented June 10, 1952

2,599,617

UNITED STATES PATENT OFFICE 2,599,617

DRAW BAR CONTROL

Earl T. Davis, Cuthbert, Ga.

Application November 26, 1947, Serial No. 788,241

3 Claims. (Cl. 97—47)

My invention relates to a draw bar control, and particularly to control mechanism for adjusting the position and preventing, when desired, the sidewise shifting or swinging of the draw bar of a vehicle such as a tractor or other prime mover having a swingable draw bar, such as is found now on the Ford-Ferguson tractor, for example.

Tractors, for example, of the class described, have means only for preventing the maximum travel of the swingable draw bar from side to side so as to prevent the mechanism from interfering with the tractor wheels. Such mechanism is suitable for plowing, cultivating and the like in straight rows on level land, but experience has proved that it is unsuitable for similar operations on hillsides and around curves because there the swingable draw bar shifts farther and farther "down hill" or toward the inside of the curve on each succeeding operation. For example, row crops planted on a hillside or in curved rows cannot be successfully cultivated with tractors equipped with swingable draw bars, and without my draw bar control, because on each succeeding cultivation the draw bar swings farther and farther "down hill" or toward the inside of the curve so that the plants are eventually plowed up or damaged by the plows sweeping into them.

An object of my invention is to provide means whereby the sidewise movement of a swingable draw bar can be controlled.

Another object of my invention is to provide a draw bar control which can be readily adjusted by the operator with one hand and without moving from his seat.

Another object of my invention is to provide draw bar control means which is efficient, simple and rugged in construction, easy to install and operate, and inexpensive to manufacture.

The invention will be best understood from a consideration of the following detailed description taken in connection with the accompanying drawings forming part of this specification, with the understanding, however, that the invention is not confined to any strict conformity with the showing of the drawings but may be changed or modified as long as such changes or modifications mark no material departure from the salient features of the invention as expressed in the appended claims.

Fig. 1 is a top view showing the draw bar control applied to a tractor.

Fig. 2 is a perspective view of the draw bar control mechanism per se.

Fig. 3 is a side view taken along the line 3—3 in Fig. 1.

Fig. 4 is a detail view of the operating lever and associated parts taken from the opposite side from that shown in Fig. 3.

Fig. 5 is a cross-sectional detail view taken along the line 5—5 in Fig. 3.

A tractor, equipped with my novel draw bar control, is indicated generally at 11, having an operator's seat 12 and right and left-hand traction wheels 13, 13', respectively. The tractor is provided with a draw bar 14 which is swingably connected to the axle housings 15, 15' by the arms 16, 16', respectively. Chains 17, 17' limit the maximum swinging movement of the draw bar from side to side, right and left, respectively. In the illustration provided a cultivator rig 18 is shown attached to the draw bar and carrying plow points 19, for example, all as well known. Also, the raising and lowering of the draw bar is accomplished by a power lift operated by handle 20 which controls the up and down movement of power lift arms 21, 21', connected to the draw bar arms 16, 16', respectively, through universal joints 22, 22', respectively, as is customary and well known.

My novel draw bar control, shown per se in Fig. 2, comprises a frame member having an elongated base portion 23 secured to the axle housing 15, as by bolts 24, so that the frame member is positioned substantially horizontally and substantially at a right angle to the axis of the axle housing 15. The frame member also has an upstanding portion 25 to which an operating handle 26 is pivotally attached as at 27. The operating handle 26 is provided with a spring actuated latch 28 which is controlled by hand grip member 29 and is arranged to engage in suitable notches provided in the arcuate locking member 30 for locking the operating handle 26 in adjusted position. The arcuate locking member 30 is attached to or made a part of the frame member. Operating cables, ropes or other flexible control means 31, 31' are attached to the operating handle 26 as at 32.

From the point of attachment 32, the flexible control means 31 passes forward and over a pulley or sheave wheel 33, having its axis of rotation mounted horizontally in the upstanding portion 25 of the frame member. The flexible control means 31 then passes rearward and around the lower wheel of a dual pulley or sheave 34, having its axis of rotation vertically mounted on a horizontal extension 35. The flexible control means 31 then passes across to the other side of the tractor and is connected to the draw bar 14 by connecting means 36.

From the point of attachment 32, the flexible control means 31' passes rearward and around the upper wheel of pulley 34, thence across to the opposite side of the tractor and around a pulley or sheave wheel 37 which is attached to the axle housing 15'. The flexible control means 31' then passes back across the tractor and is connected to the draw bar 14 by connecting means 36' on the end of the draw bar opposite the end to which the connecting means 36 is attached. Turnbuckles 38, 38' are used for adjusting the length of the flexible control means 31, 31', respectively.

In Fig. 5 is shown a cross-sectional detail view, taken along the line 5—5 in Fig. 3, showing a type of joint sometimes used in swingably connecting the draw bar arms 16, 16' to the tractor and to the draw bar. In this type of joint, the cross bar arms 16, 16' rotatably retain a ball member 39 which is drilled or pierced for mounting on pin or stub shaft 40 for swingable connection to the tractor and similar stub shafts 40' for swingable connection to the draw bar.

With the operating handle 26 in upright position, turnbuckles 38, 38' can be adjusted so that the flexible control cables 31, 31' will cause the draw bar 14 to be centered behind the tractor; and with the slack taken out of the cables, the draw bar is firmly held in adjusted position and sidewise swinging of the draw bar is obviated. If the operating handle 26 is moved backward, the tension on the cables 31, 31' is simultaneously and correspondingly increased and decreased respectively, and the draw bar will be shifted to the right. Further movement of the handle 26 in the same direction will cause further shifting of the draw bar to the right. If the handle 26 is moved forward, the tension on the cables 31, 31' is simultaneously and correspondingly decreased and increased, respectively, and the draw bar will be shifted to the left. It will thus be obvious that the position of the draw bar is under the complete control of the operator, that the operator may shift the draw bar either right or left, at will, and lock the draw bar in any desired adjusted position by means of the latch 28. It is also obvious that free or uncontrolled sidewise swinging or shifting of the draw bar is eliminated by the use of my novel draw bar control.

Having thus fully described my invention, I claim:

1. A draw bar control for vehicles having a swingable draw bar, comprising a frame member having an elongated base portion arranged and adapted to be fastened to the vehicle and an upstanding portion, an adjustable operating handle pivotally connected to said upstanding portion, latch means operatively connected to said handle for locking it in adjusted position, a pulley wheel mounted on said upstanding portion forward of said handle, and having its axis of rotation in an horizontal position, a dual pulley having an upper wheel and a lower wheel and being mounted on an extension of said upstanding portion rearward of said handle and having its axis of rotation in a vertical position, a fourth pulley wheel arranged and adapted for mounting on said vehicle on the side thereof opposite said frame member, a plurality of rope-like control means fastened to said handle, one of said control means passing from said handle forward over said first mentioned pulley wheel, thence rearward around said lower pulley wheel and thence over to the end of the draw bar farthest from said frame member and arranged and adapted for connection thereto, another of said control means passing from said handle rearward around said upper pulley wheel, thence around said fourth pulley wheel and thence to the end of the draw bar nearest said frame member and arranged and adapted for connection thereto, and turnbuckles connected to said control means for adjusting the effective length thereof.

2. A draw bar control for vehicles having a swingable draw bar, comprising a frame member having a base portion arranged and adapted to be fastened to the vehicle and an upstanding portion, an adjustable operating handle pivotally connected to said upstanding portion, means operatively connected to said handle for locking it in adjusted position, a pulley wheel mounted on said upstanding portion forward of said handle, a dual pulley having an upper wheel and a lower wheel and being mounted on an extension of said upstanding portion rearward of said handle, a fourth pulley wheel arranged and adapted for mounting on said vehicle on the side thereof opposite said frame member, a plurality of flexible control means fastened to said handle, one of said control means passing from said handle forward over said first mentioned pulley wheel, thence rearward around said lower pulley wheel and thence over to the end of the draw bar farthest from said frame member and arranged and adapted for connection thereto, another of said control means passing fro msaid handle rearward around said upper pulley wheel, thence around said fourth pulley wheel and thence to the end of the draw bar nearest said frame member and arranged and adapted for connection thereto, and means connected to said control means for adjusting the effective length thereof.

3. A draw bar control for vehicles having a swingable draw bar, comprising a frame member arranged and adapted to be fastened to the vehicle, an adjustable operating handle pivotally connected to said frame member, means operatively connected to said handle for locking it in adjusted position, a pulley wheel mounted on said frame forward of said handle, a second pulley wheel mounted on said frame rearward of said handle, a third pulley wheel arranged and adapted for mounting on said vehicle on the side thereof opposite said frame member, a plurality of flexible control means fastened to said handle, one of said control means passing from said handle forward over said first mentioned pulley wheel and thence over to the end of the draw bar farthest from said frame member and arranged and adapted for connection thereto, another of said control means passing from said handle rearward around said second pulley wheel, thence around said third pulley wheel and thence to the end of the draw bar nearest said frame member and arranged and adapted for connection thereto.

EARL T. DAVIS.

REFERENCES CITED

The following references are of record in the file of this patent:

UNITED STATES PATENTS

| Number | Name | Date |
| --- | --- | --- |
| 706,875 | Allen | Aug. 12, 1902 |
| 2,220,338 | Koebel | Nov. 5, 1940 |
| 2,364,887 | Wray | Dec. 12, 1944 |

FOREIGN PATENTS

| Number | Country | Date |
| --- | --- | --- |
| 651,742 | France | Oct. 15, 1928 |